(12) United States Patent
Risser et al.

(10) Patent No.: US 10,876,958 B2
(45) Date of Patent: Dec. 29, 2020

(54) GAS-DETECTING DEVICE WITH VERY HIGH SENSITIVITY BASED ON A HELMHOLTZ RESONATOR

(71) Applicants: AEROVIA, Reims (FR); UNIVERSITE DE REIMS CHAMPARGNE ARDENNE, Reims (FR); C.N.R.S., Paris (FR)

(72) Inventors: Christophe Risser, Reims (FR); Virginie Zeninari, Reims (FR); Bertrand Parvitte, Reims (FR)

(73) Assignee: AEROVIA, Reims (FR)

( * ) Notice: Subject to any disclaimer, the term of this patent is extended or adjusted under 35 U.S.C. 154(b) by 355 days.

(21) Appl. No.: 15/769,516

(22) PCT Filed: Oct. 21, 2016

(86) PCT No.: PCT/FR2016/052741
§ 371 (c)(1),
(2) Date: Apr. 19, 2018

(87) PCT Pub. No.: WO2017/068301
PCT Pub. Date: Apr. 27, 2017

(65) Prior Publication Data
US 2018/0306704 A1    Oct. 25, 2018

(30) Foreign Application Priority Data

Oct. 21, 2015  (FR) .................................... 15 60028
Nov. 9, 2015   (FR) .................................... 15 60724

(51) Int. Cl.
*G01N 21/17*  (2006.01)
*G01N 21/05*  (2006.01)

(52) U.S. Cl.
CPC ......... *G01N 21/1702* (2013.01); *G01N 21/05* (2013.01); *G01N 2021/1704* (2013.01)

(58) Field of Classification Search
None
See application file for complete search history.

(56) References Cited

U.S. PATENT DOCUMENTS 4,817,413 A * 4/1989 Asano ................ G01N 21/1702
                                                73/24.02
5,933,245 A * 8/1999 Wood ................. G01N 21/1702
                                                356/246

(Continued)

*Primary Examiner* — Jill E Culler
(74) *Attorney, Agent, or Firm* — Patshegen IP LLC; Moshe Pinchas

(57) ABSTRACT

The invention relates to a device comprising: a resonant tank (100) consisting of two primary tubes (105, 106) which are closed on the ends thereof and interconnected, close to each of the ends thereof, by two secondary tubes (109, 110), and provided with a gas-introducing means (118, 119); a first laser source (112) modulated to a first resonance frequency of the tank, which supplies an excitation energy in at least one of the primary tubes, with an emission wavelength corresponding to a local maximum absorption wavelength for a first gas, for generating a first stationary wave propagating along the secondary tubes; a second laser source (117) modulated to a second resonance frequency of the tank, which supplies an excitation energy in at least one of the secondary tubes, with an emission wavelength corresponding to a local maximum absorption wavelength for a second gas, for generating a second stationary wave propagating along the primary tubes; at least one acoustoelectric transducer (103, 104, 123, 124) arranged on a wall of each tube for detecting the acoustic signals produced in said tube; and means (120, 122) for processing the signals from the transducers in order to extract two amplitudes for the two stationary waves.

8 Claims, 3 Drawing Sheets

(56) References Cited

U.S. PATENT DOCUMENTS

| | | | | |
|---|---|---|---|---|
| 8,437,000 | B2* | 5/2013 | Cole | G01N 21/031 |
| | | | | 356/436 |
| 9,335,259 | B2* | 5/2016 | Gliere | G01N 21/03 |
| 10,288,553 | B2* | 5/2019 | Rouxel | G01N 29/2425 |
| 2005/0160791 | A1* | 7/2005 | Kung | G01N 33/0039 |
| | | | | 73/24.02 |
| 2005/0210956 | A1* | 9/2005 | Crane | G01N 29/348 |
| | | | | 73/24.01 |
| 2012/0266655 | A1* | 10/2012 | Brun | G01N 21/1702 |
| | | | | 73/24.02 |
| 2013/0205871 | A1* | 8/2013 | Zeninari | G01N 21/1702 |
| | | | | 73/24.02 |

* cited by examiner

GAS-DETECTING DEVICE WITH VERY HIGH SENSITIVITY BASED ON A HELMHOLTZ RESONATOR

TECHNICAL FIELD OF THE INVENTION

The present invention envisages a very-high-sensitivity gas analysis device based on a Helmholtz resonator. It applies in particular to the detection of traces of gas in ambient air, eg for fighting pollution, detecting gas leaks or preventing chemical risks.

STATE OF THE ART

Today, analyzing gas in trace state is increasingly frequent in the industrial and environmental sectors. Among the technologies able to detect species in the ppb (parts per billion, ie $10^{-9}$) range of concentrations, optical technologies consisting of optically exciting the molecule to be detected by using a laser are the most promising and have the following advantages:

high selectivity of the measurement;
high sensitivity;
high accuracy of the measurement; and
a measurement range covering all gases, subject to using a wavelength appropriate for the optical excitation of the species looked for by the laser.

There are many optical technologies. The most commonly-used technologies are CRDS (Cavity Ring-Down Spectroscopy), OFCEAS (Optical Feedback Cavity Enhanced Absorption Spectroscopy) and photoacoustic technology.

Photoacoustic technology is of special interest because of its simplicity, robustness, and the threshold detection levels that can be achieved while maintaining a high level of selectivity. Current industrial requirements are gradually moving away from the ppb scale, towards ppt (parts per trillion, ie $10^{-12}$).

Achieving these extremely low detection and measurement levels requires techniques such as CRDS and OFCEAS to significantly increase the durations (equivalent to distances) of the excitation optical beam's travel and/or to increase the integration time. Increasing the travel time requires increasingly complex instruments that are difficult to adjust from an optical standpoint and which remain very sensitive to temperature and pressure changes, and to vibrations. Increasing the integration time, for a fixed travel time, makes it possible to decrease the threshold detection level but constitutes a second-best solution, rather than a major improvement. In addition, increasing the integration time means that the fast measurements required for measuring, in particular, flows based on the Eddy covariance modeling technique can no longer be obtained.

Photoacoustic technology makes it possible to achieve the same level of threshold detection as other techniques, with advantages in terms of simplicity of adjustment and stability over time, coupled with fast measurements. However, it also does not provide the detection levels currently required for industrial applications.

Patent FR 2 815 122 describes a Helmholtz cell gas detection device. This device consists of a laser whose beam, modulated at the cell's resonance frequency, passes through a measurement cell. The cell consists of two large volumes connected by two capillaries. The cell is closed by three semi-transparent windows that let the laser beam pass through. By photoacoustic effect, Helmholtz resonance makes it possible to produce a differential measurement in which the signals from the two acoustoelectric transducers, eg microphones, are of opposite phases. The measurement of the voltage difference in the signals output by the transducers is then proportional to the concentration of the gas in the cell.

The pressure variations are located in the large volumes. The first transducer measures pressure variations in the first large volume. The second transducer measures the pressure in the second volume, in the opposite phase from the first volume. A differential measurement makes it possible to double the photoacoustic signal caused by the presence of the gas in the cell, while simultaneously subtracting the surrounding parasitic noise.

One of the conditions that brings about the creation of the standing pressure wave is imposed by the maximized coverage between the modulation of the light intensity emitted by the laser and the distribution of the resonance mode under consideration.

Some problems encountered by the existing techniques are listed below. The operating frequency of all the elements constituting the photoacoustic system is imposed by the acoustic resonance frequency of the measurement cell. The frequency of a Helmholtz resonator at macroscopic dimensions and operating in the first mode is in the low frequencies range (<kHz). However, electronic and acoustic noise are inversely proportional to the working frequency. Consequently, the system is restricted to operating at frequencies that are not conducive to a high signal-to-noise ratio, despite the differential measurement.

Increasing the photoacoustic signal and that of the resonance frequency is possible thanks to the miniaturization of the measurement cell. Nevertheless, this process requires improving the injection and shaping of the beam, whose dimensions are close to the inlet diameter of the cell. In addition, manufacturing the cell gets significantly more complex to achieve an internal surface state level close to the macroscopic scale when sizes decrease.

The concentration of the gas to be analyzed is deduced from the measurement of the voltage at the terminals of the electroacoustic transducers. When measuring low concentrations, the photoacoustic effect that leads to making the cell resonate is not only due to the heating of the gas by the laser, but also by the heating of the windows, which absorb a portion of the laser's power. This noise caused by the heating of the windows is therefore measured by the transducers and takes part in degrading the system's detection threshold.

For the detection of multiple gases, in the device described in patent FR 2 963 102, a laser passes through the first resonating volume, and another laser passes through the second volume, in which the pressure variation is in opposite phase to the pressure variation in the first volume. The two lasers are modulated at the same frequency, ie the resonance frequency of the photoacoustic cell. The described system makes it possible to alternatively measure the concentration of two gases. To do this, either the lasers must be alternatively switched off, or the laser beams must be blocked mechanically and alternatively. The first solution may require a few seconds' wait before the laser's emission wavelength has stabilized at the absorption peak of the first molecule to be detected. This waiting time will depend on the efficiency of the laser temperature regulation in the vicinity of an operating point. The second solution requires using a mechanical element subject to wear and not really appropriate for use in a photoacoustic system. Neither case allows the simultaneous measurement of the two gases.

SUBJECT OF THE INVENTION

The present invention aims to remedy all or part of these drawbacks.

To this end, according to a first aspect, the present invention envisages a photoacoustic device for detecting at least one gas, which comprises:
- a Helmholtz-type resonant tank consisting of two primary tubes, whose ends are closed, connected to each other near their extremities by two secondary tubes;
- a means for introducing gas in said tank;
- at least one first source of radiant energy modulated to a first resonance frequency of the tank, which supplies an excitation energy in at least one of the primary tubes, with an emission wavelength matching a local maximum absorption wavelength for a first gas, each said first source of radiant energy being positioned opposite a window closing a primary tube extremity, to generate a first standing wave propagating along the secondary tubes;
- at least one second source of radiant laser energy modulated to a second resonance frequency of the tank, which supplies an excitation energy in at least one of the secondary tubes, with an emission wavelength matching a local maximum absorption wavelength for a second gas, each said first source of radiant energy being positioned opposite a window closing a primary tube extremity, to generate a second standing wave propagating along the primary tubes;
- at least one acoustoelectric transducer arranged on a wall of each tube for detecting the acoustic signals produced in said tube;
- a means for processing the signals coming from the transducers positioned on the primary tubes, to extract an amplitude of the first standing wave; and
  - a means for processing the signals coming from the transducers positioned on the secondary tubes, to extract an amplitude of the second standing wave.

Thanks to these provisions, one measures simultaneously the quantity of two different gases in a single cell, without either of the measurements disrupting the other.

In some embodiments, the sources of radiant laser energy have emission wavelengths that match the absorption peaks of the same gas.

In some embodiments, the sources of radiant laser energy have the same emission wavelength.

Thanks to each of these provisions, the detection and measurement of the quantity of the gas looked for is more reliable.

In some embodiments, the device that is the subject of the invention comprises two sources of radiant laser energy opposite two parallel tubes of the Helmholtz-type tank, said two sources of radiant laser energy having emission wavelengths matching absorption peaks of the same gas, possibly identical, in which the modulation means is designed to modulate simultaneously the excitation energy supplied by the two sources of radiant laser energy located opposite two different tubes by setting a 180° phase shift between the excitation energies of said sources of radiant laser energy.

Thanks to these provisions, the detection and measurement of the quantity of the looked-for gas is more reliable, without disrupting the detection and measurement of the quantity of the second gas.

In some embodiments, in the Helmholtz-type resonant tank, the extremities of the primary tubes touch the extremities of the secondary tubes.

In some embodiments, the extremities of the tubes have walls that are inclined in relation to the principal axes of the tubes to reflect the acoustic waves from the primary tubes towards the secondary tubes and vice versa.

Thanks to each of these provisions, the acoustic waves successively follow the tubes of the Helmholtz-type tank.

In some embodiments, the Helmholtz-type tank comprises at least one gas inlet or one gas outlet on one end wall of a tube.

Thanks to these provisions, the gas inlets and outlets are away from the acoustoelectric transducers, thus reducing the risks of disrupting the captured acoustic signals.

In some embodiments, at least one means for processing signals coming from the transducers positioned on parallel tubes comprises an operational amplifier, the signals output from the transducers being applied to the positive and negative inputs of the operational amplifier.

Thanks to these provisions, the electronic circuit is simplified and induces a very small amount of noise.

BRIEF DESCRIPTION OF THE FIGURES

Other advantages, aims and particular features of the invention will become apparent from the non-limiting description that follows of at least one particular embodiment of the devices and the method that are the subjects of the present invention, with reference to drawings included in an appendix, wherein.

DESCRIPTION OF EXAMPLES OF REALIZATION OF THE INVENTION

It is now noted that the figures are not to scale.

Figure 1:
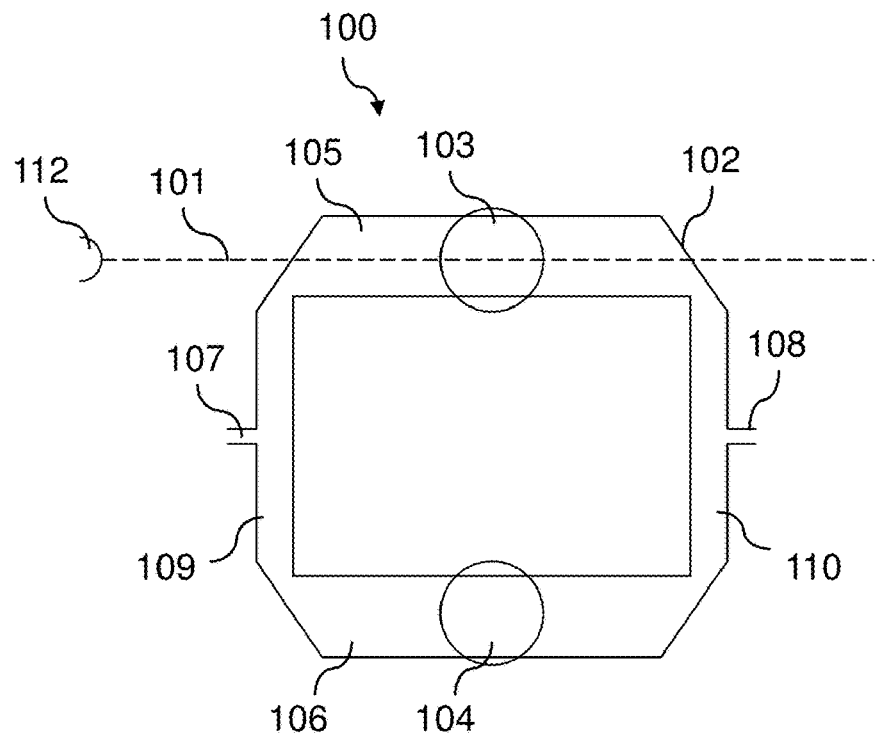
FIG. 1 shows, schematically, a first resonance mode of a Helmholtz-type tank of a device that is the subject of the present invention.

FIG. 1 shows a Helmholtz-type tank 100 comprising parallel primary tubes 105 and 106, closed at their ends and connected to each other by parallel secondary tubes 109 and 110. The primary tubes and secondary tubes are perpendicular.

In the middle of these primary tubes 105 and 106, acoustoelectric transducers, 103 and 104 respectively, are positioned. The extremities of the primary tubes are windows 102 that are inclined in relation to the principal axes of the primary tubes to reflect the acoustic signals from the primary tubes towards the secondary tubes and vice versa. The windows 102 are transparent to the wavelengths of the light waves used.

A gas inlet and a gas outlet, respectively 107 and 108, constitute a means for introducing gas into the tank 100. This inlet and outlet are closed while the device for detecting and measuring a quantity of gas is operating.

A first source of radiant laser energy 112 supplies an excitation energy to the primary tube 105, at an emission wavelength matching a maximum local absorption wavelength for a first gas.

The first source of radiant laser energy 112 is positioned opposite a window closing one extremity of the primary tube 105.

The first source of radiant laser energy 112 is modulated at a first resonance frequency of the tank to generate a first standing wave that propagates along the secondary tubes 109 and 110.

As is easily understood, when the first source of radiant laser energy 112 is switched on, it heats the gas for which the emission wavelength of the first source 112 is an absorption wavelength. When heating up, this gas generates an acoustic wave, which propagates through the secondary tubes 109 and 110 to the primary tube 106. The pressure variations inside the primary tube 106 therefore mirror the pressure variations inside the primary tube 105, with a delay. Then, these pressure variations inside the primary tube 106 are transmitted into the primary tube 105 by means of the secondary tubes 109 and 110. The total round-trip time of the pressure wave to the primary tube 105 is a period of a first resonance of the tank 100. The inverse of this first period is the first resonance frequency.

By modulating the emission of the first source 112 at this first resonance frequency, one causes a standing wave to appear, the pressure variations between the two primary tubes 105 and 106 being in opposite phases.

The acoustoelectric transducers 103 and 104 supply an electrical signal at the first resonance frequency and with an amplitude proportional to the quantity of the first looked-for gas in the tank 100. By subtracting these signals, one obtains a signal whose amplitude is proportional to the quantity of the first looked-for gas, with the acoustic noise removed (by definition, this noise is substantially in phase in the two primary tubes 105 and 106).

Figure 2:
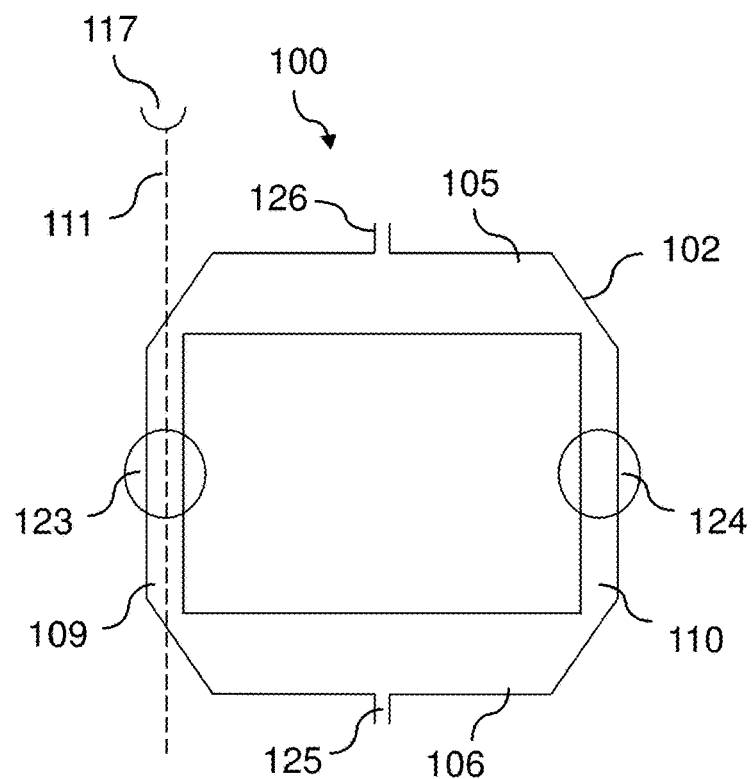
FIG. 2 shows, schematically, a second resonance mode of a Helmholtz-type tank of a device that is the subject of the present invention.

FIG. 2 shows the Helmholtz-type tank 100.

In the middle of the secondary tubes 109 and 110, acoustoelectric transducers, 123 and 124 respectively, are positioned.

A gas inlet and a gas outlet, respectively 125 and 126, constitute a means for introducing gas into the tank 100. This inlet and outlet are closed while the device for detecting and measuring a quantity of the gas is operating.

A second source of radiant laser energy 117 supplies an excitation energy into the secondary tube 109, at an emission wavelength that matches a maximum local absorption wavelength for a second gas, possibly identical to the first gas, the wavelength of the second source possibly being identical to the wavelength of the first source 112.

The second source of radiant laser energy 117 is positioned opposite a window closing one extremity of the primary tube 105.

The second source of radiant laser energy 117 is modulated at a second resonance frequency of the tank to generate a second standing wave that propagates along the primary tubes 105 and 106. It can be seen that the second standing wave coincides with a node of this mode at the location of the transducers 103 and 104, such that the detection and measurement of gas quantities based on the signals coming from these transducers 103 and 104 are not disrupted by this second standing wave, whose working frequency for the primary mode also works at a different frequency from the secondary mode.

In the same way as for the first source 112, by modulating the emission of the second source 117 to the second resonance frequency, one causes a standing wave to appear, the pressure variations between the two secondary tubes 109 and 110 being in opposite phases.

The acoustoelectric transducers 123 and 124 supply an electrical signal at the second resonance frequency and with an amplitude proportional to the quantity of the second looked-for gas in the tank 100. By subtracting the signals, one obtains a signal whose amplitude is proportional to the quantity of the second looked-for gas, with the acoustic noise and the pressure variations related to the first standing wave removed (which, by design, is substantially in phase in the two secondary tubes 109 and 110).

Figure 3:
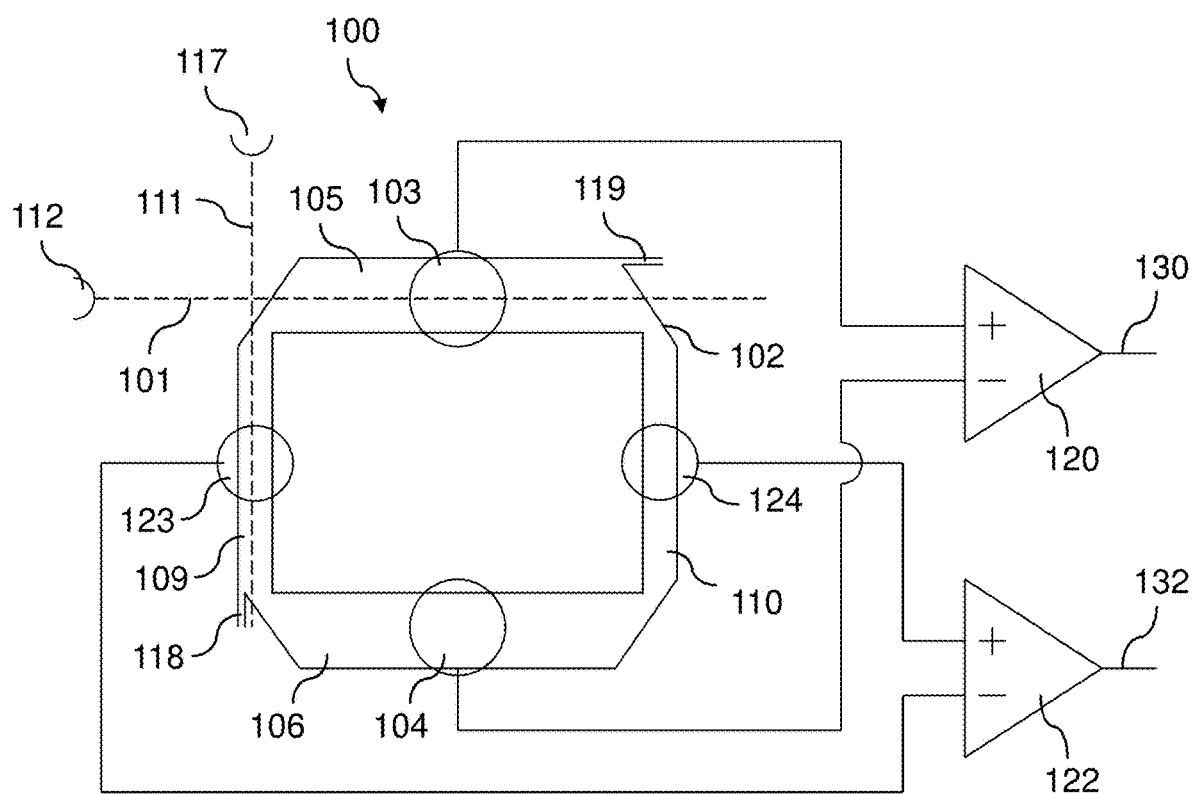
FIG. 3 represents, schematically, a particular embodiment of the device that is the subject of the present invention.

As can be seen in FIG. 3, one finds, in some embodiments of the device that is the subject of the present invention, all the components illustrated in FIGS. 1 and 2, except for the gas inlets and outlets 107, 108, 125 and 126.

These gas inlets and outlets are replaced by gas inlets 118 and 119 respectively, positioned in the vicinity of or on the surfaces inclined in relation to the axes of the tubes and providing the join between the primary tubes and the secondary tubes. These positions reduce the disruptions to the sound signals perceived by the acoustoelectric transducers.

The following are provided as means for processing the signals coming from the acoustoelectric transducers:
  an operational amplifier 120, whose positive and negative inputs receive respectively the outbound signals from the transducers 103 and 104; and
  an operational amplifier 122, whose positive and negative inputs receive respectively the output signals from the transducers 123 and 124.

The output signals at outputs 130 and 132 of these operational amplifiers 120 and 122 have amplitudes proportional to the quantities of gas exhibiting an absorption of the wavelengths of the sources of radiant laser energy 112 and 117.

In some variants, one doubles at least one of the sources of radiant laser energy 112 and 117. Preferably, in these variants, the detection and measurement device comprises two sources of radiant laser energy opposite two parallel tubes of the Helmholtz-type tank, said two sources of radiant laser energy having emission wavelengths matching absorption peaks of the same gas, possibly identical. The means for modulating the emission from these sources is designed to modulate simultaneously the excitation energy supplied by the two sources of radiant laser energy located opposite two different tubes by setting a 180° phase shift between the excitation energies of said sources of radiant laser energy.

Figure 4:
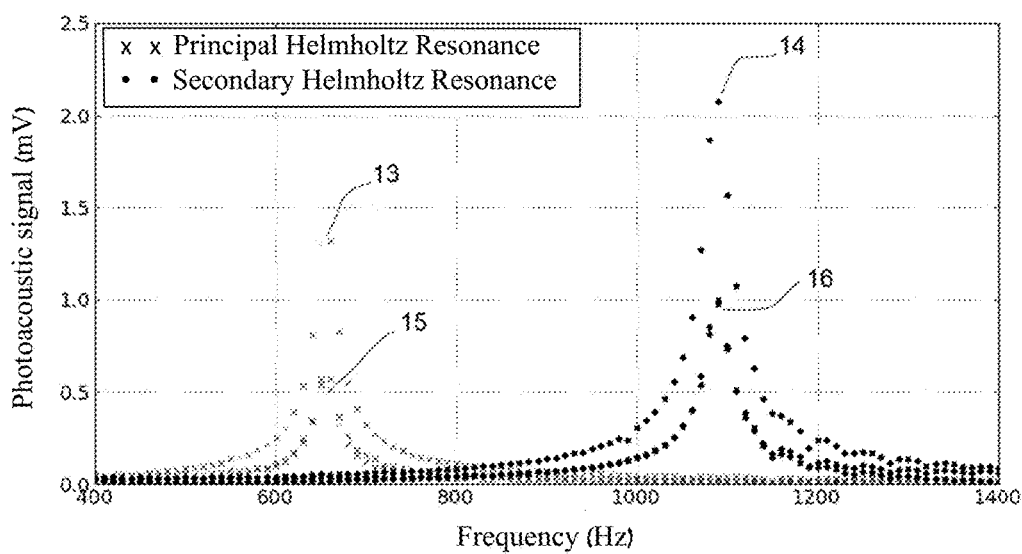
FIG. 4 shows a comparison of response curves of the two resonance modes of the device illustrated in FIG. 3.

FIG. 4 shows the amplitudes of signals coming from the acoustoelectric transducers and the amplitudes of the different signals obtained on output from the operational amplifiers.

To obtain these values, one causes the modulation frequency of each of the sources of radiant energy 112 and 117 to vary from 400 Hz to 1400 Hz.

In this FIG. 4, the crosses 15 represent the amplitudes of the output signals of the transducers 123 and 124, which operate when the first Helmholtz mode is excited. The crosses 13 represent the differential measurement of the output signals of the transducers 103 and 104 for this first mode.

Similarly, the dots 16 represent the amplitudes of the output signals of the transducers 103 and 104, which operate when the second Helmholtz mode is excited. The dots 14 represent the differential measurement of the output signals of the transducers 123 and 124 for this second mode.

It can be seen that the resonance frequencies are highlighted and that, for each resonance frequency, only one of the two measurements reveals this resonance. Thus, none of the standing waves constitute a parasitic wave for the other standing wave.

FIG. 4 also shows that the device that is the subject of the present invention allows for operation at a Helmholtz-type resonance at frequencies above one kHz. The cell's dimensions are compatible with a simple coupling of the laser beam (collimating lens). Similarly, the technological manufacturing constraints are close to those of a macroscopic cell.

For the simultaneous detection of several gases, one utilizes the first resonance mode for the detection of a first gas, and the second mode for the detection of a second gas.

In some embodiments, the device that is the subject of the present invention is mounted on a vehicle, the inlet tube 118 communicating with the exterior of the vehicle and sucking air in to carry out the detections of gases to be detected.

Figure 5:
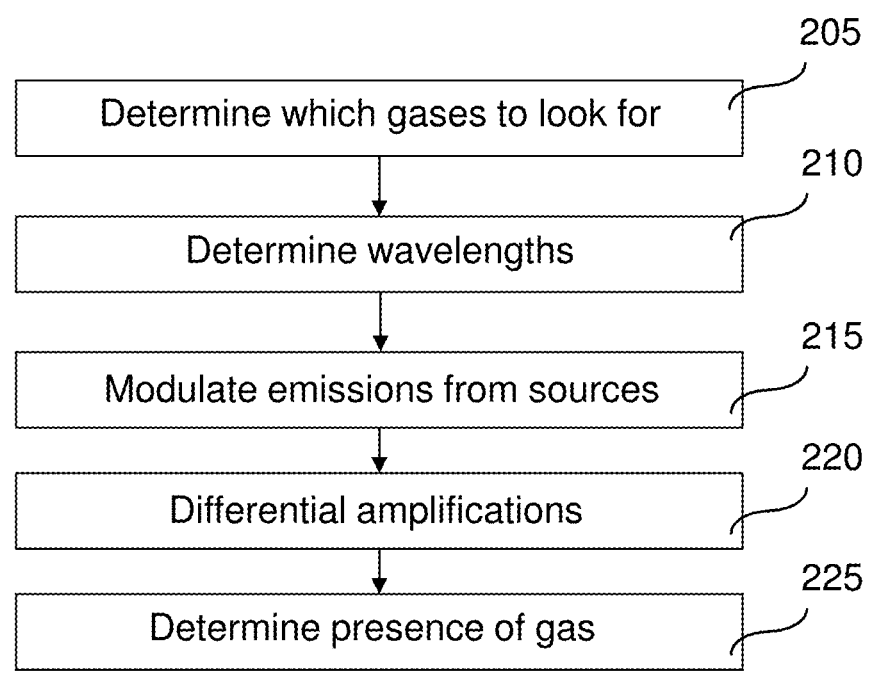
FIG. 5 represents, in the form of a logical diagram, steps in a particular embodiment of the method that is the subject of the present invention.

As shown in FIG. 5, in a particular embodiment, the method comprises firstly a step 205 of determining the looked-for gases.

In a step 210, one determines the wavelengths of the radiant energy sources that match the absorption peaks of the looked-for gases.

In step 215, one modulates the emissions of the radiant energy sources, respectively, to the tank's resonance frequencies.

In a step 220, one captures and amplifies differentially the sound signals present in the various tubes.

In a step 225, as a function of this differential signal, one determines, for each looked-for gas, if it is present in the tubes of the photoacoustic device and one estimates the quantity of this gas as a function of the differential amplitude obtained.

As can be understood from reading the description of FIG. 5, depending on the operating modes of this device:
either one utilizes simultaneously at least two sources of radiant laser energy at two wavelengths characteristic of a single gas, which increases the detection and measurement sensitivity of the quantity of gas;
or one utilizes simultaneously the sources of radiant laser energy at wavelengths characteristic of different gases, which enables the simultaneous detection and measurement of the quantities of the looked-for gases.

The invention claimed is:

1. Device for the photoacoustic detection of at least one gas, comprising:
a Helmholtz-type resonant tank consisting of two primary tubes, whose ends are closed, connected to each other near their extremities by two secondary tubes;
a means for introducing gas in said tank;
at least one first source of radiant laser energy modulated to a first resonance frequency of the tank, which supplies an excitation energy in at least one of the primary tubes, with an emission wavelength matching a local maximum absorption wavelength for a first gas, each said first source of radiant energy being positioned opposite a window closing a primary tube extremity, to generate a first standing wave propagating along the secondary tubes;
at least one second source of radiant energy modulated to a second resonance frequency of the tank, which supplies an excitation energy in at least one of the secondary tubes, with an emission wavelength matching a local maximum absorption wavelength for a second gas, each said second source of radiant energy being positioned opposite a window closing a secondary tube extremity, to generate a second standing wave propagating along the primary tubes;
at least one acoustoelectric transducer arranged on a wall of each tube for detecting the acoustic signals produced in said tube;
a processor for processing the signals coming from the transducers positioned on the primary tubes, to extract an amplitude of the first standing wave; and
a processor for processing the signals coming from the transducers positioned on the secondary tubes, to extract an amplitude of the second standing wave.

2. Device according to claim 1, wherein the sources of radiant laser energy have emission wavelengths that match the absorption peaks of the same gas.

3. Device according to claim 1, wherein the sources of radiant laser energy have the same emission wavelength.

4. Device according to claim 1, which comprises two sources of radiant laser energy opposite two parallel tubes of the Helmholtz-type tank, said two sources of radiant laser energy having emission wavelengths matching absorption peaks of the same gas, possibly identical, wherein the modulation means is designed to modulate simultaneously the excitation energy supplied by the two sources of radiant laser energy located opposite two different tubes by setting a 180° phase shift between the excitation energies of said sources of radiant laser energy.

5. Device according to claim 1, wherein, in the Helmholtz-type resonant tank (100), the extremities of the primary tubes touch the extremities of the secondary tubes.

6. Device according to claim 1, wherein the extremities of the tubes have walls that are inclined in relation to the principal axes of the tubes to reflect the acoustic waves from the primary tubes towards the secondary tubes and vice versa.

7. Device according to claim 1, wherein the Helmholtz-type tank comprises at least one gas inlet or one gas outlet on one end wall of a tube.

8. Device according to claim 1, wherein at least one means for processing signals coming from the transducers positioned on parallel tubes comprises an operational amplifier, the signals output from the transducers being applied to the positive and negative inputs of the operational amplifier.

* * * * *